United States Patent [19]
Ogle

[11] 3,998,385
[45] Dec. 21, 1976

[54] AUTOMOBILE LITTER EVACUATION SYSTEM

[75] Inventor: David W. Ogle, Alderwood Manor, Wash.

[73] Assignee: Litco Enterprises, Inc., Alderwood Manor, Wash.

[22] Filed: Aug. 13, 1973

[21] Appl. No.: 388,007

[52] U.S. Cl. .................. 237/12.3 B; 180/89.11; 15/313; 98/2.05
[51] Int. Cl.² .................................. B60H 1/02
[58] Field of Search ............ 224/29 R, 29 D, 29 H, 224/29 I, 29 J, 29 K, 29 L; 232/37, 43.2, 43.1, 1 R, 36; 131/231, 242; 15/313; 296/37; 98/2.05, 2; 237/12.3 R, 12.3 B

[56] References Cited
UNITED STATES PATENTS

| | | | |
|---|---|---|---|
| 1,777,514 | 10/1930 | Burgin et al. | 15/313 X |
| 1,992,450 | 2/1935 | Sporman | 131/242 UX |
| 2,277,568 | 3/1942 | Tavernese | 15/313 X |
| 3,250,382 | 5/1966 | Beil et al. | 224/29 H |
| 3,648,837 | 3/1972 | Ogle | 224/29 H |
| 3,841,553 | 10/1974 | Taylor | 15/313 X |

Primary Examiner—Robert J. Spar
Assistant Examiner—Jerold M. Forsberg
Attorney, Agent, or Firm—Robert B. Hughes

[57] ABSTRACT

A litter removal or evacuation apparatus for installation in a vehicle such as an automobile, truck, pleasure water craft, etc. There is a main litter removal system for larger articles such as bottles, napkins, etc; and an ash tray removal system to evacuate cigarette butts, cigar butts, etc., from the vehicle ash tray. In each of these two systems, there is a litter receptacle to receive the litter, a removal tube leading from the vehicle passenger compartment to the receptacle, and a suction tube leading from its related receptacle to the intake housing of the conventional heating and ventilating system of the vehicle. A suction adequate to draw litter through the removal tubes into the litter receptacles is created through the blower system of the vehicle heating and ventilating system, by simultaneously closing off the intake vent through which ambient air is normally drawn into the heating and ventilating system, and also operating the blower. In a second embodiment an elongate removal tube also acts as a receptacle for the litter.

16 Claims, 11 Drawing Figures

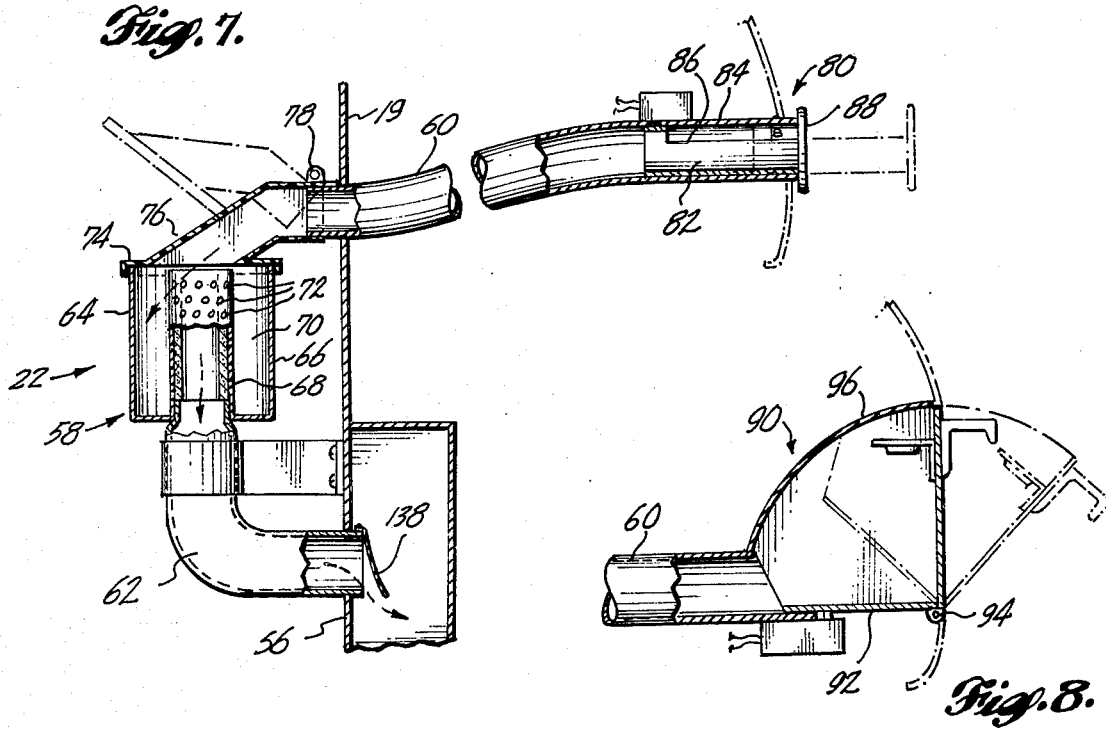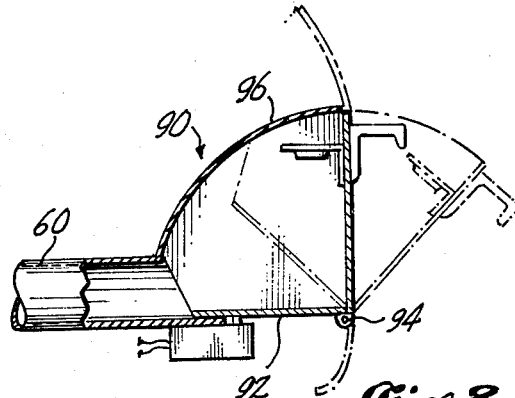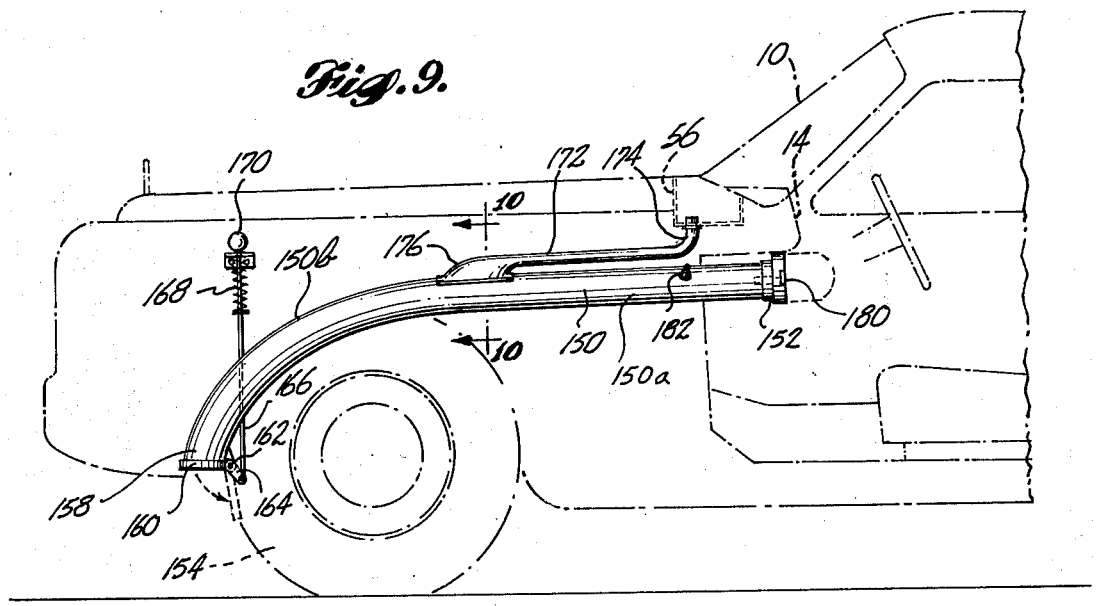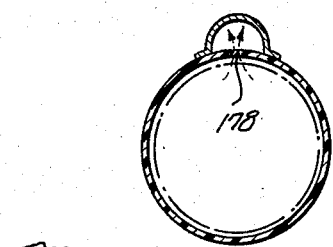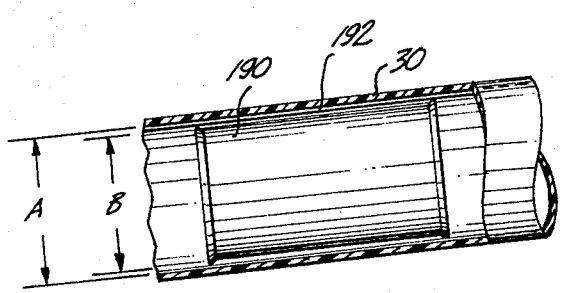

AUTOMOBILE LITTER EVACUATION SYSTEM

BACKGROUND OF THE INVENTION

1. Field of the Invention

The present invention relates generally to litter removal systems adapted for use in present day vehicles.

2. Description of the Prior Art

In U.S. Pat. No. 3,648,837, the inventor in that patent being the same as the applicant herein, there is shown an automobile litter removal system where litter is drawn through removal tubes into litter receptacles in the engine compartment of the automobile. Suction to operate these systems is provided by a blower that is powered from the crank shaft of the engine through the automobile pulley arrangement and a magnetic clutch.

Also it has been proposed in the prior art to operate an automobile litter removal system by means of the suction created by the intake manifold of the automobile. Such devices are shown in Leland, U.S. Pat. No. 2,656,039; Frost, U.S. Pat. No. 3,011,627, and Elswood, U.S. Pat. No. 3,062,363.

Further, there is shown in the prior art, litter removal systems which are powered by electric motors specifically provided for that purpose. Typical of these are: Nicholas, U.S. Pat. No. 2,680,569; Thompson, U.S. Pat. No. 2,851,156; Nickless, U.S. Pat. No. 3,230,567; and Coleman, U.S. Pat. No. 3,500,492.

It is an object of the present invention to provide an improved litter removal system for a vehicle such as an automobile, which system operates in conjunction with conventional vehicle components in a manner to provide effective removal of the litter.

SUMMARY OF THE INVENTION

The present invention is adapted for installation in a vehicle such as a conventional present day automobile, truck, pleasure water craft, etc., and is arranged to operate in combination with the existing air ventilating blower system of the vehicle, which conventionally provides a flow of air either through a heater or a bypass passage or through both the heater and the bypass passage. There is a litter receptacle means mounted to the vehicle for collection of litter from the passenger compartment, a removal tube means leading from the passenger compartment to said receptacle, and suction means leading from the receptacle means to an existing intake housing of the vehicle blower system. In the preferred embodiment, when the litter removal system is activated, the air intake opening of the inlet housing is closed and the blower is operated to create a suction in the intake housing sufficient to cause an air flow through the removal tube of a velocity sufficient to move litter placed in the removal tube.

In the particular configuration shown herein, there is a main litter removal system having its own removal tube and suction tube, to remove litter such as cans, napkins, etc. There is a closure cap at the inlet of the removal tube, and the opening of this closure cap activates a switch which causes closure of the inlet of the blower intake housing and also causes operation of the blower. There is an ash tray removal system, also having its own receptacle, inlet tube and suction tube. Closure of the ash tray operates a time delay switch to also close the intake housing valve and operate the blower. After a short interval of time, the switch automatically shuts off to permit the intake valve to open and de-energize the blower. In another embodiment, the collector tube itself serves the additional function of the receptacle.

According to another facet of the present invention, it has been found that by sizing the removal tube of the main litter removal system properly, conventional present day beverage containers can be carried in the tube very effectively. Other features of the present invention will become apparent from the following detailed description.

BRIEF DESCRIPTION OF THE DRAWINGS

FIG. 7 is a sectional view of the ash tray removal system of the present invention;

FIG. 8 is a sectional view of a second ash tray suitable for use in the present invention;

FIG. 9 is a side elevational view of a modified main litter removal system;

FIG. 10 is a sectional view taken along line 10—10 of FIG. 9, and

FIG. 11 is a longitudinal sectional view of the removal tube of the main litter removal system, with a conventional beverage container shown being moved therein.

DESCRIPTION OF THE PREFERRED EMBODIMENT

Figure 1:
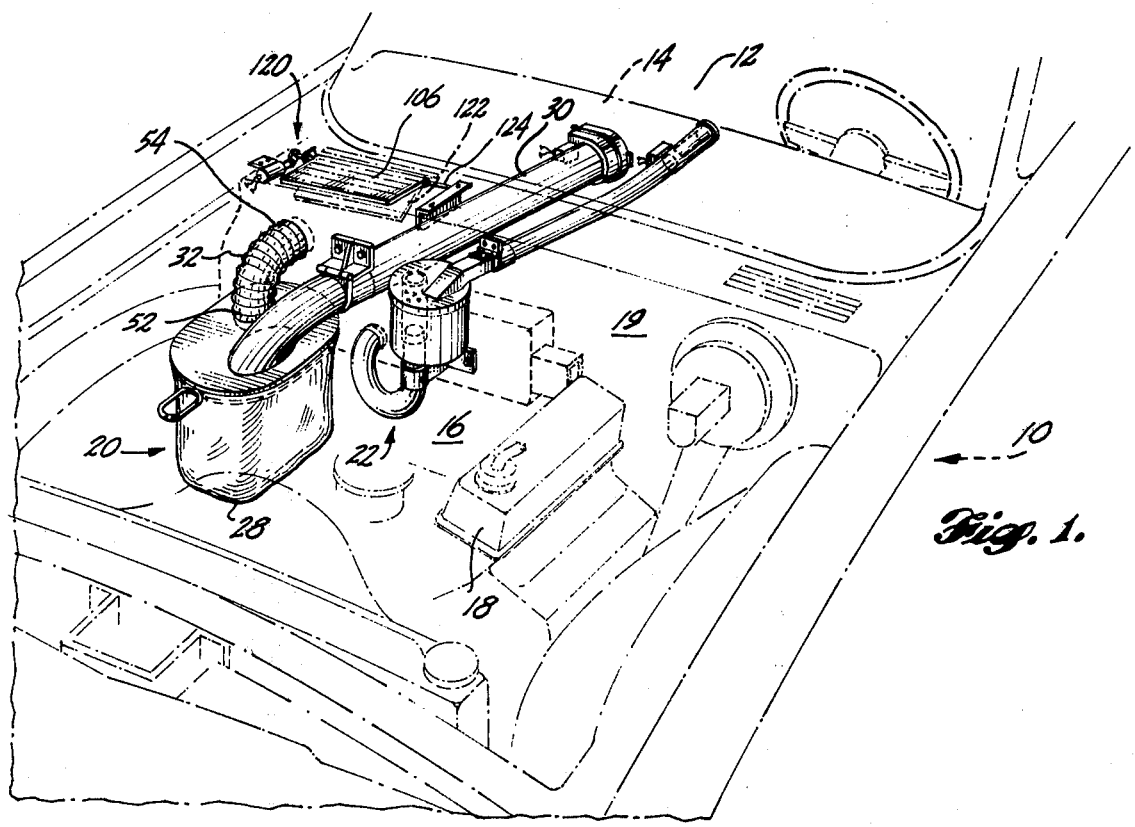
FIG. 1 is an isometric view illustrating the apparatus of the present invention in a conventional automobile.
Figure 2:
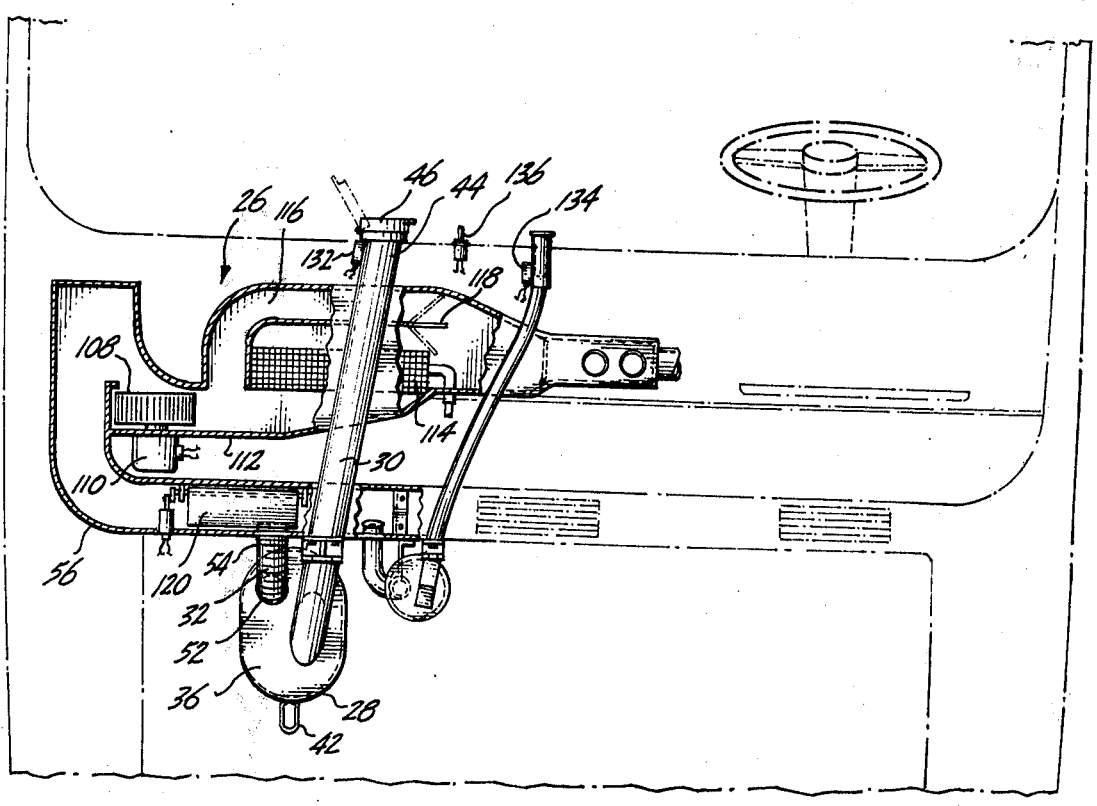
FIG. 2 is a top plan view of the apparatus shown in FIG. 1.

The present invention will be described below with reference to present day automobiles, it being understood that it could also be applied to other vehicles, such as trucks, pleasure water craft, etc. The first embodiment of the present invention is illustrated in FIGS. 1 through 8. In FIGS. 1 and 2 there is shown portions of a conventional automobile 10, comprising a passenger compartment 12 with a dash board 14, and an engine compartment 16 having a conventional automobile engine 18 and a fire wall 19. In the over all litter removal or evacuation apparatus of the present invention, there are two interrelated systems. First, there is a main litter removal system 20 for evacuating miscellaneous litter such as bottles, cans, garbage, paper and this type of litter generated by the occupants of a vehicle, this litter hereinafter being referred to as "major litter." Secondly, there is an ash tay removal or evacuation system 22, adapted to remove cigar butts, cigarette butts, ashes and the like from the automobile ash tray. As will be described more particularly hereinafter, these 2 litter removal systems 20 and 22 are arranged to work in combination with the conventional heating and ventilating system of the automobile 10, such a system being shown in FIG. 2, and designated generally 26.

Figure 3:
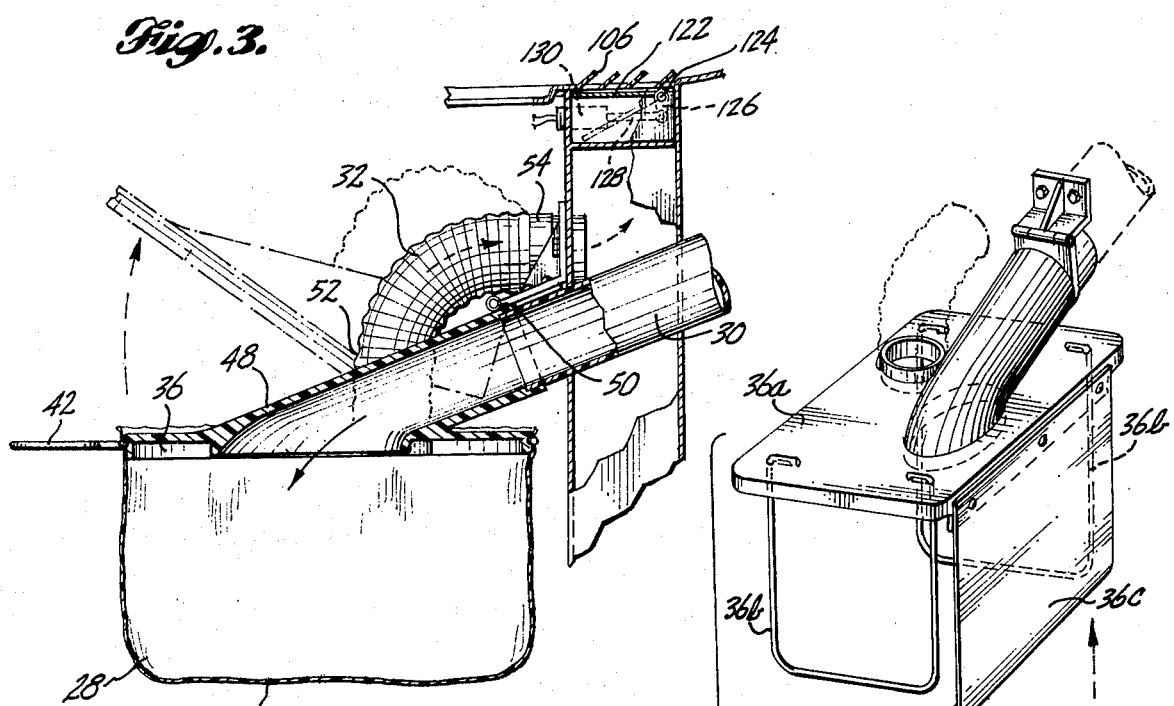
FIG. 3 is a sectional view of a portion of the main litter removal system of the present invention.
Figure 4:
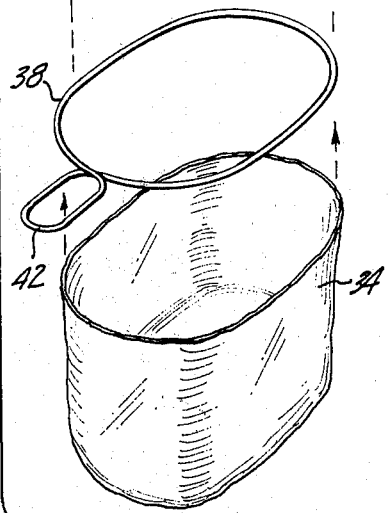
FIG. 4 is an exploded view illustrating the litter receptacle of the system shown in FIG. 3.

The main litter removal system 20 comprises a litter receptacle 28, a removal conduit 30 and a suction conduit 32. One form of the receptacle 28 is shown in FIGS. 3 and 4, and comprises a semi-flexible containing member 34, a closure lid 36 and a spring retainer 38.

The upper edge of the containing member 34 fits over a peripheral groove 40 in the lid 36, and the wire clamp 38 presses the upper portion of the containing member 34 into the groove 40 to make a substantially airtight connection between the lid 36 and the containing member 34. By squeezing a crossed handle member 42 of the retaining clamp 38, the clamp 38 can be expanded to release the containing member 34 from the lid 36 so that the containing member 34 can be emptied of its accumulated litter.

The litter removal conduit 30 has its inlet end 44 located at a convenient location at the automobile dash board 14 at a level moderately above that of the lid 36 of the receptacle 28. The inlet 44 has a hinge mounted closure cap 46 which is spring loaded toward its closed position, shown in full lines in FIGS. 1 and 2. The outlet end 48 of the conduit 30 opens into the receptacle 30 through the lid 36 to which the conduit 30 is firmly attached in a substantially airtight connection. The conduit 30 is made of moderately flexible material and has a hinged connection 50 at the fire wall 19 of the automobile 10 so that the entire receptacle 20 can be move upwardly for easy removal and replacing the containing member 28.

The suction conduit 32 has its inlet end 52 connected to the receptacle 28 through the lid 26. The outlet end 54 of the suction tube 32 opens into an air intake housing 56 of the automobile heating and air ventilation system 26. As will be described more particularly hereinafter, a negative pressure is applied to the suction tube 32 which causes air flow through the inlet of the removal conduit 30 and into the receptacle 28, this inflow of air pushing litter through the conduit 30 into the receptacle 28. At the outlet of the suction tube 32, there is provided a flap type check valve which opens under moderate pressure to permit flow through the tube 32 into the intake chamber 56 when the system is energized, and prevents any backflow entering the tube 32 from the chamber 56.

Figure 5:
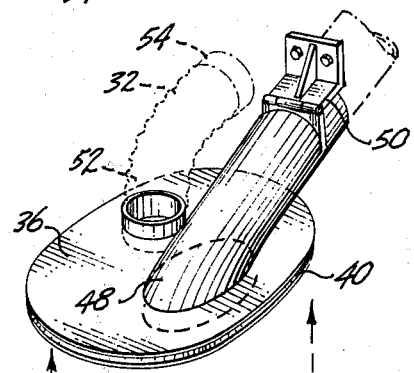
FIG. 5 is a view similar to FIG. 4, but showing a second form of a litter receptacle.
Figure 6:
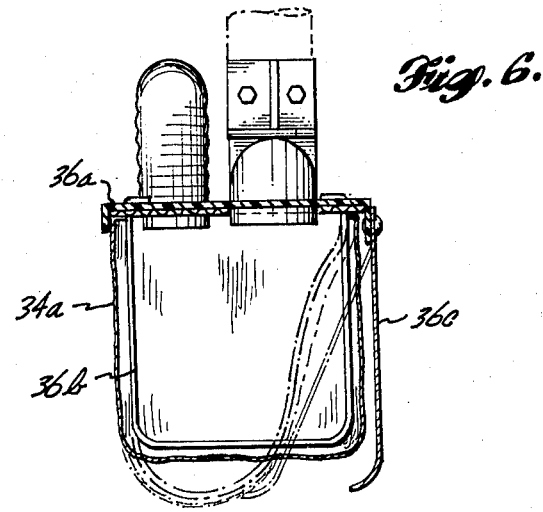
FIG. 6 is a sectional view of the receptacle of FIG. 5 shown assembled.

A second form of the receptacle for the main litter removal system is shown in FIGS. 5 and 6. There is a containing member 34a made of a flexible yet airtight material, and it is connected to a top plate 34b, having openings 34c and 34d for the conduits 30 and 32. There is a lid 36a having depending U-shaped wire members 36b, which extend through end slots 34e in the container plate 34b to prevent the containing member 34a from collapsing when a negative pressure is applied. A protective plate 36c of a suitable heat resistant material depends from one side of the lid 36a to protect the containing member 34a from the heat of the engine.

The ash tray removal system 22 is functionally similar to the main litter removal system 20, and comprises a receptacle 58, a removal conduit 60 and a suction conduit 62. The receptacle 58 comprises an annular containing member 64 comprising outer and inner concentric cylindrical walls 66 and 68 defining therein an annular retaining chamber 70. The lower portion of the chamber 70 is filled with a scented water. The top of the inner wall 68 is closed, except that a plurality of relatively small holes 72 are formed in the upper portion of the wall 68. The suction tube 62 communicates with the lower open end of the inner wall 68 so that air in the receptacle chamber 70 is drawn through the openings 72 and through the suction tube 62.

There is a closure lid 74 which fits over the receptacle 64 to form a substantially airtight seal, and the outlet portion 76 of the conduit 60 is connected to the lid 74. The tube 60 has a hinged connection 78 at the automobile fire wall 19 in a manner generally similar to the conduit 30 of the main litter removal system 20. This permits the lid 74 to be lifted and the container 64 to be removed for dumping the ash tray refuse.

An ash tray configuration particularly adapted for use in the present invention is shown in FIG. 7. This ash tray 80 comprises a cylindrical container 82 slide mounted in the inlet 84 of the removal conduit 60. The upper top of the container 82 is opened at 86 to permit the insertion of cigarettes, cigars, etc., and the outer end of the container 82 is closed by a cap 88 providing a peripheral lip by which the ash tray can be pulled out to its open position, as shown in dotted lines of FIG. 7, or pushed into its closed position, as shown in full lines of FIG. 7. The cylindrical configuration of the ash tray housing 82 tends to align the cigarette butts and cigar butts longitudinally with respect to the conduit 60, so that such ash tray refuse passes more easily through the conduit 60 into the receptacle 58.

A second form of an ash tray suitable for use in the present invention is shown at 90 in FIG. 8. There is a container 92 formed as an arcuate section of a cylinder and hinge mounted at 94 for swing movement relative to a stationary curved housing plate 96. When the container 92 is swung to its closed position, shown in full lines of FIG. 8, the lower part of the container 92 communicates openly with the removal conduit 60.

As previously mentioned herein, the two litter removal systems 20 and 22 operate in conbination with the automobile heating and ventilating system 26. This system 26 is, except for the modifications to be described hereinafter, a conventional heating and ventilating system, and accordingly it will be described only briefly herein. The aforementioned housing 56 communicates with the automobile air intake vent or opening 106 positioned just forward of the automobile windshield. There is a blower 108 powered by an electrical motor 110 which draws outside air through the intake vent 106 into the intake housing 56, and blows this air under moderate pressure into a distribution housing 112 located beneath the dash board 14. This housing 112 contains a heater 114 and also a heater bypass ventilating passage 116, and there is a plate-like valve 118 which selectively directs the air from the blower 108 through either the heater 114 or passage 116, or through both heater 114 and passage 116.

The components of the heating and ventilating system 20 that have been disclosed thus far in this description of the preferred embodiment are common to many present day automobiles. In the preferred form of the present invention, this conventional heating and ventilating system is modified by providing a closure valve, generally designated 120 by which the intake vent 106 is selectively closed. As shown herein, this valve 120 comprises a valve plate 122 pivotally mounted to a shaft 124 positioned along the rear edge of the vent opening 106. Depending from the shaft 124 and fixedly attached thereto is a lever arm 126 which in turn is attached to an actuating rod 128 of a solenoid 130. Energizing the solenoid 130 retracts the rod 128 to swing the plate 128 upwardly to close the intake vent 106, while de-energizing the solenoid 130 permits this plate 128 to drop to its open position and permit inflow of outside air through the intake 106 and into the intake housing 26.

There are three separate switches by which the apparatus of the present invention can be activated. One switch 132 is mounted proximate the closure cap 46 of the main litter removal system 30 and is activated by opening the closure cap 46 to the dotted line position shown in FIG. 2. A second switch 134 is mounted proximate the ash tray 80 or 90 and is activated by closing the ash tray to the position shown in full lines in FIG. 7 or FIG. 8. A third switch 136 is mounted on the dash board 14 and is manually operated by a person in the passenger compartment 12.

Each of these switches 132, 134 and 136 functions to activate the solenoid 130 to raise the valve plate 122 to close the vent opening 106. There is another switch which is mounted in the solenoid 130 and closes upon activation of solenoid 130 to energize the blower motor 110 and cause the blower 108 to operate. With the intake opening 106 closed by the valve plate 122, the blower 108 reduces the pressure in the intake chamber 56 to create a suction in the two suction tubes 32 and 62.

In operation, let it be assumed first that major litter, such as cans, napkins, etc., is to be removed from the passenger compartment. The closure cap 46 is swung out to its open position, and the litter is placed in the inlet 44 of the litter removal tube 30. Opening of the cap 46 closes the switch 132 to energize the solenoid 130 to close the intake vent 106 by means of the plate 122 and start the blower 108 functioning. This sucks air from the passenger compartment 12 through the tube 30 and into the receptacle 28, with this flow of air through the tube 30 moving the litter placed in the tube 44 into the receptacle 28. A screen in the intake end of the tube 32 prevents litter from being drawn into the tube 32. The litter falls to the bottom of the receptacle 28 to be removed therefrom at a later time when container 34 is emptied, as described previously herein. When the closure cap 46 is released, it is spring loaded to return to its loaded position, thus opening the switch 132, to permit the plate 122 to drop to its open position and to de-energize the motor 110 to stop operation of the blower 108. It has been found that while the suction force created by the blower 108 in the tube 30 is sufficient to move litter through the tube 30, this suction normally does not draw any litter from the receptacle 28 to the inlet of the suction tube 32.

When it is desired to empty the ash tray 80 or 90, the ash tray 80 or 90 is moved to its closed position to activate the switch 134. In the same manner as described above this causes the valve plate 122 to close and activate the blower 108, thus creating a suction in the ash tray removal tube 60. There is sufficient leakage around the ash tray housing to permit sufficient velocity of air flow from the passenger compartment 12 through the relatively small ash tray removal tube 60 to blow the cigar butts, cigarette butts, ashes, etc., into the container 58. The ash tray switch 134 is a time delay switch which remains closed for a short period of time (e.g. five to ten seconds) and then automatically opens, such as an Amperite 12 Glo Time Delay Relay. Reactivation of the switch 134 is accomplished simply by opening the ash tray 80 or 90 and moving it back again to its closed position.

Removal of ash tray litter from the container 58 is accomplished by raising the lid 74, removing the container 58, dumping the litter and replacing the container 58 with additional scented water. At the outlet of the suction tube 62, there is provided a check valve in the form of a flap 138 which opens under moderate pressure to permit flow through the tube 62 into the intake chamber 56, but which prevents any backflow, for example by some wind blowing into intake housing 56, so that ashes are not blown back through the ash tray 80 or 90 into the passenger compartment 12. The ash tray litter receptacle 58 is so arranged that the litter falls to the bottom of the receptacle 58 and cannot be drawn through the top openings 72 that lead into the suction tube 62. While the suction from the blower 108 is sufficient to draw the ash tray litter into the receptacle 58, this suction is not so great as to draw ash tray litter from the receptacle 58 into the intake housing 56.

In FIGS. 9 and 10, there is shown a modified form of the main litter disposal system of the present invention. In this modified version, there is a disposal tube 150 which serves the dual function of a removal tube and a litter receptacle. This tube has an inlet end 152 located adjacent the dash board 14 of the automobile 10. From its inlet 152, the tube 150 has a first portion 150a which extends forwardly and generally horizontally, and a second forward section 150b which extends forwardly and downwardly in a moderate curve to a location forward of the front left wheel 154 of the automobile 10 within the body structure of the automobile.

The forward portion 150b of the tube 150 is curved downwardly with a moderate degree of curvature to terminate in a downwardly directed outlet opening 158. The outlet 158 is closed by a cap 160 pivotally mounted at 162 to the outlet end 158 of the tube 150. An operating lever 164 is rigidly connected to the cap 160 and is connected to an upstanding operating rod 166 which is urged downwardly by a compression spring assembly 168 to hold the cap 160 in its closed position. The cap 160 is swung downwardly to its open position, as shown in dotted lines of FIG. 9, by lifting the rod 166 by means of a knob 170 at the top end of the rod 166. When the knob 170 is released, the compression spring 168 acting on the rod 166 forces the cap 160 back to its closed position covering the forward outlet opening 158 of the tube 150.

There is a suction tube 172 positioned above the forward tube section 150a. As in the first embodiment of the invention, the outlet end 174 of the suction tube 172 connects to the air intake housing 56 of the heating and ventilating system 26 of the automobile 10. The intake end 176 of the suction tube 172 connects to tube 150 at approximately the transition area of the tube sections 150a and 150b, and communicates with the interior of the tube 150 through a plurality of holes 178 in the tube 150. The manner in which the heating and ventilating system 26 functions to provide a suction in the tube 172 is the same as that described in the first embodiment of the present invention. That is to say, when the inlet cap 180 for the tube 150 is opened, this closes a switch which activates the blower and closes the vent opening to create a suction which draws air into the suction tube 172.

In operation, when it is desired to dispose of litter, the closure cap 180 is opened to energize the system. Air is drawn from the interior of the tube 150 through the holes 176 into the suction tube 172 and into the intake housing 56 of the heating and ventilating system of the automobile. Since the forward outlet end 158 of the tube 150 is closed by the cap 160, there is a suction which draws air into the inlet 152 of the tube 150 to the location of the suction tube inlet 176. When a bottle, napkin, or other litter is deposited into the inlet 152, it is drawn downwardly and forwardly in the tube 150. As the litter reaches the forward downwardly curved portion 150b of the tube 150, normal gravity forces cause the litter to continue to the forward bottom outlet portion 158. At a later time, when it is desired to remove the litter from the system, the knob 170 is operated to open the cap 160, with the accumulated litter falling from the outlet 158 of the tube 172. In the event litter becomes stuck in the tube 150, high pressure air can be discharged into the tube 150 to blow the litter to the outlet end 158. For this purpose, an access opening is provided in the tube 150 adjacent the automobile firewall, this opening being normally closed by a removable cap 182.

Another facet of the present invention is the results achieved by the proper dimensioning of the main litter removal tube, which is designated 30 in the first embodiment and 150 in the second embodiment. For convenience, in describing this particular facet of the present invention, reference will be made only to the tube 30, it being understood that it is not limited to the particular configuration of that first embodiment. With reference to FIG. 11, there is shown a conventional beverage container 190 in the tube 30.

It has been found that if the inside diameter (indicated at A in FIG. 11) of the tube 30 is made three inches, within reasonably close tolerances, the removal of common present day beverage containers, such as soft drink cans or bottles, beer bottles, etc., is greatly facilitated. The outside diameter (indicated at B in FIG. 11) of the common present day beverage container is between a lower value of 2 and ⅝ inches and a higher value of two and thirteen-sixteenths inches. With the inside diameter of the tube 30 being just slightly larger (i.e. three-eighths of an inch to three-sixteenths of an inch) than the diameter of the beverage containers, there is sufficient clearance so that the beverage container 190 does not become caught in the tube 30, and yet the beverage container provides a sufficient obstacle to the flow of air so that it is moved along by the air stream.

In addition to the above, it is believed that another physical phenomenon takes place. As air is sucked from the area of the tube 30 downstream of the beverage container 190, air flows forwardly around the small passageway 192 formed between the tube 30 and the container 190. Since the container 190 tends to rest on the bottom of the tube 30, this passageway 192 is larger above the container 190, which results in an increased velocity of air flow above the container 190. Since an increase in air velocity, according to Bernouli's law, causes a corresponding decrease in static pressure, it can reasonably be assumed that there is a pressure decrease above the container 190 which tends to lift the container 190 off the bottom of the tube 30. This in turn decreases the frictional forces between the container 190 and the tube 30 which facilitates travel of the container through the tube 30.

Regardless of the correctness of the above theory, it has been found that proper dimensioning of the tube 30 is quite critical to the operation of the present invention. For example, if the inside diameter of the tube 30 is made as great as 3¼ inches, the system is much less effective in carrying common beverage containers; and if it is as small as 2¾ inches, there is a tendency to impede travel of the container through the tube 30.

What is claimed is:

1. In combination with a vehicle having a passenger compartment and an air ventilating and heating system for said passenger compartment, said air ventilating and heating system comprising a blower, an intake housing having an air inlet opening through which air is drawn by said blower, an outlet housing through which air is directed by said blower into said passenger compartment, and a heater through which air can be selectively directed for heating the air passing into the passenger compartment,
   a litter evacuation system to remove litter from said passenger compartment, said system comprising:
   a. a litter receptacle means mounted to said vehicle for collection and retention of litter from the passenger compartment,
   b. a removal tube means leading from said passenger compartment to said receptacle,
   c. air suction means leading from said receptacle means to said intake housing and arranged to draw air from said receptacle means while leaving litter therein, and
   d. activating means to cause operation of said blower to create a suction in said vehicle housing and thus cause an inflow of air through said removal tube means into said receptacle means, through said suction means, and into said intake housing,
   whereby litter placed in said removal tube means is moved by air flow therethrough into said receptacle means, with air being recirculated from said passenger compartment through said litter removal system for litter removal, and through said air ventilating system back to the passenger compartment, and with litter remaining in said litter receptacle means.

2. The system as recited in claim 1, wherein there is a closure valve for the inlet opening of the vehicle intake housing, and means to move said valve to its closed position to at least partially block said inlet opening during operation of said system.

3. The system as recited in claim 2, wherein said activating means and said valve closure means are operatively interconnected, whereby operation of one of said activating means causes operation of the closure means so that said blower operates at the same time that said closure valve for the intake opening is in its closed position.

4. The system as recited in claim 3, wherein there is a closure means for said removal tube means to close said removal tube means from said passenger compartment, and switch means operable by movement of said closure means to close said intake opening closure valve and activate said blower.

5. The system as recited in claim 4, wherein said switch means is arranged to operate by opening of said closure means.

6. The system as recited in claim 4, wherein said switch means is caused to be operated by closing of said closure means.

7. The system as recited in claim 6, wherein said switch means is a time delay switch means, whereby after said closure means is moved to operate said switch means, said switch means is deactivated after a predetermined period of time to deactivate said system.

8. The system as recited in claim 2, wherein said closure valve comprises a plate member swing mounted to move to its closed position adjacent said air inlet opening and to an open position spaced from said inlet opening.

9. The system as recited in claim 1, wherein said suction means comprises a tube leading from said receptacle means to said intake housing, and there is check valve means to prevent backflow of air from said intake housing into the receptacle and back to the passenger compartment.

10. The system as recited in claim 1, wherein said litter receptacle means comprises a container having a lid closing the container, and said removal tube is connected to said lid, said system further comprising hinge means mounted to said removal tube to permit a portion of said removal tube to be swung upwardly with said lid so as to have said container open for removal of litter therefrom.

11. The system as recited in claim 1, further comprising as ash tray container connected to an inlet portion of said removal tube means, said ash tray container having a cylindrical configuration about a longitudinal axis, with a longitudinal axis of the ash tray container aligned with said removal tube means, whereby debris such as cigarette butts becomes properly aligned in the ash tray for proper travel through said removal tube means.

12. The system as recited in claim 1, wherein said litter receptacle means comprises a container, a perforate member upstanding in said container, and a suction tube leading from said perforate member, whereby litter, such as ash tray litter, entering said container, falls to the bottom of the container, with air in the container being drawn through said perforate member and through said suction tube.

13. The system as recited in claim 1, wherein said removal tube means comprises a tube having a uniform cylindrical cross section, with an interior diameter approximately three-eighths to three-sixteenths larger than the diameter of cylindrical refuse, such as beverage containers, which are to travel as litter through the tube, whereby proper travel of such refuse containers is facilitated through the removal tube means.

14. The system as recited in claim 13, wherein the inside diameter of said removal tube means is less than three and a quarter inches and greater than two and three-quarter inches.

15. The system as recited in claim 14, wherein the inside diameter of said removal tube means is approximately three inches.

16. In combination with a vehicle having a passenger compartment and an air ventilating and heating system for said passenger compartment, said air ventilating and heating system comprising a blower, an intake housing having an air inlet opening through which air is drawn by said blower, an outlet housing through which air is directed by said passenger compartment, and a heater through which air can be selectively directed for heating the air passing into the passenger compartment, a litter evacuation system to remove litter from said passenger compartment, said system comprising:
 a. a separate litter receptacle means including a cover therefor mounted to said vehicle for collection and retention of litter from the passenger compartment,
 b. a removal tube means leading from said passenger compartment to the cover of said receptacle,
 c. air suction means leading from the cover of said receptacle means to said intake housing and arranged to draw air from said receptacle means while leaving litter therein, and
 d. activating means to cause operation of said blower to create a suction in said vehicle housing and thus cause an inflow of air through said removal tube means into said receptacle means, through said suction means, and into said intake housing, whereby litter placed in said removal tube means is moved by air flow therethrough into said receptacle means, with air being recirculated from said passenger compartment through said litter removal system for litter removal, and through said air ventilating system back to the passenger compartment, and with litter remaining in said litter receptacle means.

* * * * *